(12) United States Patent
King et al.

(10) Patent No.: US 8,744,675 B2
(45) Date of Patent: Jun. 3, 2014

(54) ADVANCED DRIVER ASSISTANCE SYSTEM FEATURE PERFORMANCE USING OFF-VEHICLE COMMUNICATIONS

(75) Inventors: Anthony Gerald King, Ann Arbor, MI (US); Eric L. Reed, Livonia, MI (US); Aaron L. Mills, Ann Arbor, MI (US)

(73) Assignee: Ford Global Technologies, Dearborn, MI (US)

( * ) Notice: Subject to any disclaimer, the term of this patent is extended or adjusted under 35 U.S.C. 154(b) by 148 days.

(21) Appl. No.: 13/408,065

(22) Filed: Feb. 29, 2012

(65) Prior Publication Data

US 2013/0226400 A1 Aug. 29, 2013

(51) Int. Cl.
G06F 19/00 (2011.01)

(52) U.S. Cl.
USPC .................................. 701/36; 707/999.104

(58) Field of Classification Search
USPC ............ 701/36, 301, 468, 117, 439; 340/436, 340/903
See application file for complete search history.

(56) References Cited

U.S. PATENT DOCUMENTS

| | | | |
|---|---|---|---|
| 6,405,128 B1 | 6/2002 | Bechtolsheim et al. | |
| 6,597,984 B2 | 7/2003 | Appenrodt et al. | |
| 6,735,515 B2 | 5/2004 | Bechtolsheim et al. | |
| 6,836,719 B2 | 12/2004 | Andersson et al. | |
| 6,853,908 B2 | 2/2005 | Andersson et al. | |
| 7,260,465 B2 | 8/2007 | Waldis et al. | |
| 7,415,134 B2 | 8/2008 | Ikeda et al. | |
| 2003/0134660 A1 * | 7/2003 | Himmel et al. | 455/557 |
| 2004/0153244 A1 * | 8/2004 | Kellum | 701/301 |
| 2009/0088978 A1 | 4/2009 | Ishikawa et al. | |
| 2009/0228204 A1 | 9/2009 | Zavoli et al. | |
| 2009/0299617 A1 | 12/2009 | Denaro | |
| 2010/0332127 A1 | 12/2010 | Imai et al. | |
| 2012/0140078 A1 * | 6/2012 | Higgins-Luthman | 348/148 |

* cited by examiner

Primary Examiner — Marthe Marc-Coleman
(74) Attorney, Agent, or Firm — Angela M. Brunetti; Frank MacKenzie

(57) ABSTRACT

An Advance Driver Assistance System of a vehicle collects measurements for a driving event, including GPS coordinates for a specific location from the EH system, and logs the data into an on-vehicle database. The ADAS uses the data in the on-vehicle database to develop a history associated with the specific location. Information, including GPS coordinates and recorded false output warnings, may be shared between the on-vehicle database and an off-vehicle database, such as associated with and Electronic Horizon system, providing an opportunity to significantly improve the feature performance of the ADAS. Driver assist information may be compiled between the off-vehicle database and the on-vehicle database, thereby continuously updating the knowledge base of the ADAS and optimizing feature performance of the ADAS over the life of the vehicle.

13 Claims, 2 Drawing Sheets

ADVANCED DRIVER ASSISTANCE SYSTEM FEATURE PERFORMANCE USING OFF-VEHICLE COMMUNICATIONS

TECHNICAL FIELD

The inventive subject matter generally relates to methods and one or more apparatuses for improving Advanced Driver Assistance Systems (ADAS) feature performance, and more particularly to optimizing feature performance using off-vehicle communications.

BACKGROUND

Advanced Driver Assistance Systems (ADAS) include systems such as, Forward Collision Warning (FCW), Blind Spot Warning (BLIS), Adaptive Cruise Control (ACC), and Lane Departure Warning (LDW). The systems monitor the vehicle environment and traffic conditions, typically taking measurements of objects using radar or camera-based sensors, to assist the driver. The systems typically classify object measurements into categories of valid targets (i.e., vehicles, pedestrians, lane markings, etc.) or noise (i.e., any measurement from items of non-interest such as environmental objects or road infrastructure). Further, the systems look for certain measurement signatures that tend to indicate the object as "valid". When an object, or target, is classified as "valid", the systems will determine whether the valid object is a threat that is sufficient enough to require driver assistance.

The process of detection, classification, and threat assessment has several issues and limitations. For example, the noise level, as perceived by radars or cameras, is highly dependent upon the environmental objects and road infrastructure. For a classification strategy that is non-location and non-history based, there is the potential for false classification. An object may be falsely classified as noise when it is actually a valid target. Likewise, an object may be falsely classified as a valid target, when it is, in fact, noise. Similarly, for a threat assessment strategy that is non-location and non-history based, there is also the potential for inaccurate threat assessment.

There is a need to improve the feature performance of an Advanced Driver Assistance System by increasing the reliability of the classification strategy and/or threat assessment strategy.

SUMMARY

Embodiments of the inventive subject matter are directed to improving feature performance of an Advanced Driver Assistance System in combination with on-vehicle and off-vehicle databases. For example, the ADAS may retain an on-vehicle database that stores a history of GPS coordinates associated with an output warning. Comparing a set of GPS coordinates associated with a false output warning to a history of GPS coordinates associated with false output warnings, a setting may be adjusted, based on the history of GPS coordinates, to eliminate the potential for a false output warning for that particular set of GPS coordinates.

In one embodiment of the inventive subject matter, the ADAS collects measurements for a driving event, including GPS coordinates for a specific location from the EH system, and logs the data into the on-vehicle database. The ADAS uses the data in the on-vehicle database to develop a history associated with the specific location.

In another embodiment of the inventive subject matter, information, including GPS coordinates and recorded false output warnings, may be shared between the on-vehicle database and an off-vehicle database providing an opportunity to significantly improve the feature performance of the ADAS. Driver assist information may be compiled between the off-vehicle database and the on-vehicle database, thereby continuously updating the knowledge base of the ADAS and optimizing feature performance of the ADAS over the life of the vehicle.

These and other objects, embodiments, and advantages and/or distinctions of the inventive subject matter will become readily apparent upon further review of the following specification, associated drawings and appended claims.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the inventive subject matter are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
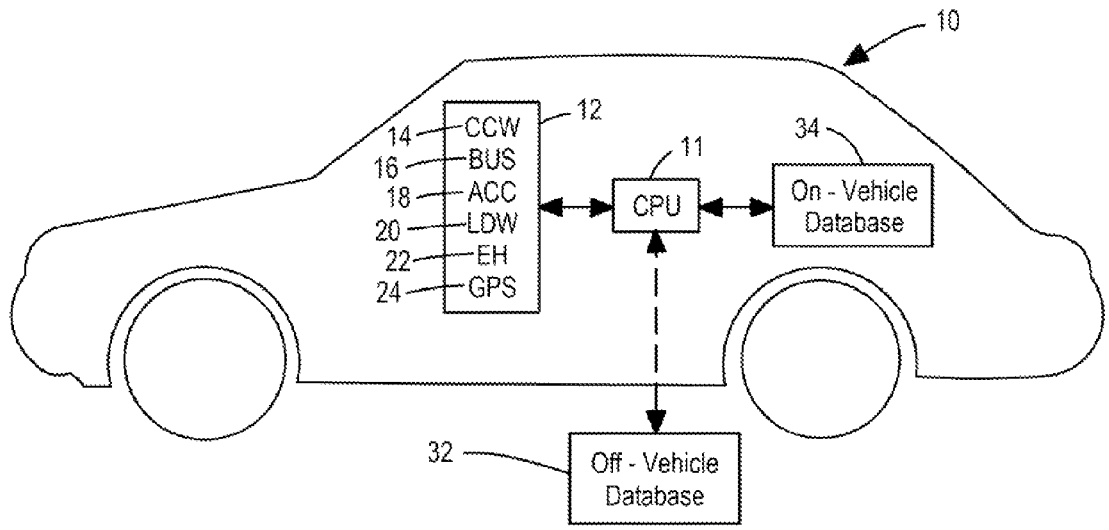
FIG. 1 is a block diagram of an Advanced Driver Assistance System of the inventive subject matter.

FIG. 1 is a block diagram of a motor vehicle 10 equipped with an Advanced Driver Assistance System (ADAS) 12 that includes, but is not limited to, output devices 14-22 having features such as a Forward Collision Warning (FCW) system 14, a Blind Spot Indicating System (BLIS) 16, an Adaptive Cruise Control (ACC) system 18, and a Lane Departure Warning (LDW) system 20. The ADAS 12 is a combination of software and hardware components in a motor vehicle that provides data used by each of the above-mentioned systems to provide driver assistance for various driving events. The ADAS 12 provides output warnings to a vehicle driver. The motor vehicle 10 also contains one or more microprocessors 11 operable to process instructions to and from various systems of the motor vehicle and various aspects of the systems as well as memory to store data such as warning information and sets of vehicle GPS coordinates. The microprocessors 11 have one or more memory locations that are capable of storing processing instructions as well as data used by each of the ADAS 12 features, EH and GPS systems during their operation. Each vehicle-based system may have a dedicated microprocessor, or the systems may share a microprocessor with one or more vehicle-based systems.

An Electronic Horizon (EH) system 22 is a feature on the motor vehicle 10 that, in conjunction with a Global Positioning System (GPS) 24, provides support for features such as in-car navigation, traffic sign recognition, and steerable headlamp systems to name just a few. The EH 22 and GPS 24 devices provide an absolute vehicle location, in the form of a set of GPS coordinates, in relation to a latitudinal and longitudinal position of the vehicle, along with detailed map location, such as road curvature, road type, speed limit, etc.

EH system 22 data may be continuously updated through a network communication with an off-vehicle database 32. Network communication with the off-vehicle database 32, by way of the EH system 22, will enable detection and correction of errors in the off-vehicle database relating to location data, which may then be passed on to an on-vehicle database 34 and accessed by the ADAS 12 and any one of the features of the ADAS 12 as well as other vehicle systems.

The ADAS 12 collects measurements for a driving event, including GPS coordinates for a specific location from the EH system, and logs the data into the on-vehicle database 34. The ADAS uses the data in the on-vehicle database 34 to develop a history associated with the specific location. The history of GPS coordinates and output warnings for a specific location may be used by any one or more of the features of the ADAS when each feature performs an operation to determine whether or not to output a warning for the driving event. The ADAS 12 may also store a history of output warnings in the on-vehicle database 34 and whether the output warnings are false output warnings. The stored historical data may be accessed by and used in conjunction with other stored database information for each feature in the ADAS 12 to make a determination as to whether to output a warning and whether output warning is valid or false.

When a false output warning for a driving event is detected by the ADAS system 12, the GPS location of the driving event is recorded locally, along with the false output warning history. According to the inventive subject matter, accessing the history of information stored in conjunction with a particular GPS location allows each feature of the ADAS to adjust a confidence level for that particular GPS location. For example, knowing that multiple false warnings have been detected for a particular GPS location will allow the ADAS to adjust a setting that is used by a particular feature when that feature of the ADAS issues a warning, thereby lowering the number, and even eliminating future, false output warnings for the particular GPS location. For example, subsequent passes through the same GPS location would result in a need for a driving event to meet a higher confidence threshold in order for an output warning to be issued by an LDW system of the ADAS. Raising the threshold for that particular location by reference to the history stored in the on-vehicle database 34 will prevent a false output warning from being issued upon subsequent passes through the same GPS location.

The EH system 22 available on a vehicle has the added benefit of accessing an off-vehicle database 32. Continuous improvement of data available to the EH system 22 is provided by way of network communication with the off-vehicle database 32. Information, including GPS coordinates and recorded false output warnings, may be shared between the on-vehicle database 32 and the off-vehicle database 34 providing an opportunity to significantly improve the feature performance of the ADAS. Driver assist information may be compiled between the off-vehicle database 32 and the on-vehicle database 34, thereby continuously updating the knowledge base of the ADAS 12 and optimizing feature performance of the ADAS over the life of the vehicle 10. Any information related to GPS coordinate sets and false output warnings that are newly stored on the on-vehicle database may be uploaded to an off-vehicle database where it may be shared with any vehicles and/or databases that access the off-vehicle database for updates. Likewise, any newly stored information on the off-vehicle database that is relevant to systems on the ADAS may be downloaded to the on-vehicle database for access by the ADAS when categorizing and issuing output warnings. In this respect, an updated history is provided to the vehicle databases for access by the vehicle-based systems.

Figure 2:
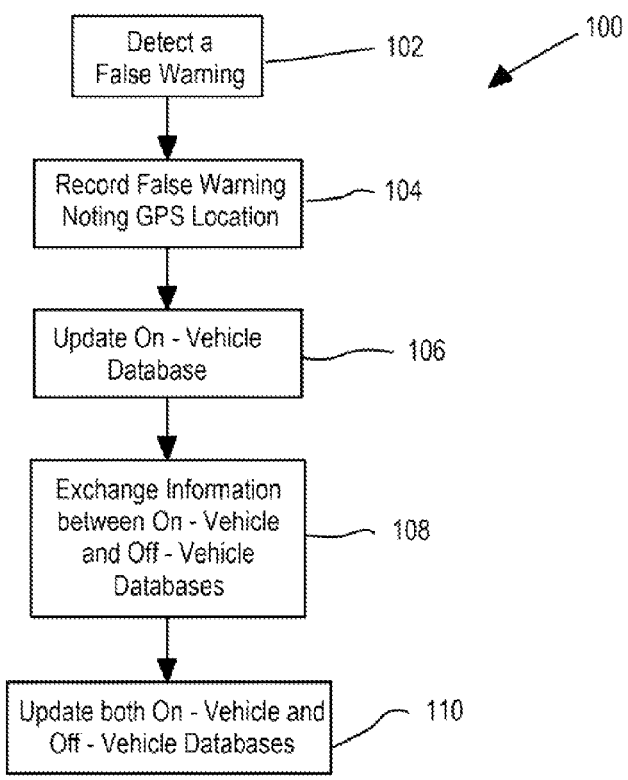
FIG. 2 is a flow diagram of a method of the inventive subject matter.

Referring now to FIG. 2, a flow diagram 100 of an illustrative process for optimizing issuance of a warning by the ADAS is shown. According to the inventive subject matter, if a vehicle is traveling in a particular GPS location and a warning occurs without significant change in driver input and the vehicle trajectory is consistent with EH data, then a false warning for that particular GPS data is identified or detected 102. The false warning may be recorded 104 by the ADAS system and stored as historical data in the on-vehicle database with respect to the particular GPS location. The on-vehicle database is updated 106 accordingly. Therefore, subsequent passes through the same location will allow the ADAS to draw from the historical data stored in the on-vehicle database and a confidence threshold for that particular GPS location may be adjusted within the ADAS. The on-board false output warning data may be modified so that a false output warning is averted when the vehicle makes subsequent passes through the same location. The historical data for the particular GPS location collected by the ADAS and stored in the on-vehicle database 34 may also be uploaded to the off-vehicle database 32.

In another embodiment, the on-vehicle history from the ADAS that is communicated to and deciphered in conjunction with the off-vehicle database 32, such as used by the EH system 22, allows detection and correction of errors in the off-vehicle database to become even more accurate. The inventive subject matter shares location-based data between the on-vehicle database and the off-vehicle database 108 in order to further improve the function of features associated with ADAS 12. Warning events issued by the ADAS 12 may be evaluated against data relevant to the particular GPS location that are downloaded from a central database, such as the off-vehicle database 32 associated with the EH system. If a false warning event is detected and is identified by the ADAS system 12, the information may be uploaded to the central database where it may be accessed by other drivers' vehicle databases as well. Sharing information between on-vehicle and off-vehicle databases provides the opportunity to update HO both databases and for so many more driving events to be documented and shared, ultimately improving the function of feature performance for vehicle systems that draw from either of the databases.

As described above, the collected measurements for a particular set of GPS coordinates are stored 104. The presently collected measurements may be compared to determine if they are associated with previously stored sets of GPS coordinates. The historical information from the ADAS may be uploaded from the on-vehicle database to a central database that is remote from the vehicle, where it may be accessed by other drivers and their ADAS systems. In this regard, a vehicle 10 that may not have passed a location that initiated a false warning would receive the benefit of the updated location information from the central database, thereby avoiding even a first false warning for the particular GPS location. The ADAS 12 is then able to make adjustments to a collision warning threshold level.

For example, if the history in the off-vehicle database shows that vehicles have been travelling at a particular GPS location at a speed that is much greater than a speed limit known in the database for that particular GPS location, then it may be implied that the speed limit stored in the off-vehicle database is incorrect, should be investigated and may need to be updated. This type of information will enable improvements to the off-vehicle database that in turn may be transferred to on-vehicle EH devices, which is then accessed by the ADAS thereby improving the feature performance of the ADAS.

Shared location-based measurement data may also be used to optimize detection and reporting of radar/sensor blockage conditions. Identifying locations where the feature blockage commonly occurs provides data necessary for the ADAS 12 to delay or inhibit blockage detections at specific locations, thereby increasing the reliability of the warnings that come from the FCW system.

Furthermore, current ADAS features rely on extensive validation drives to identify worst-case real-world driving conditions and are limited to knowledge stored in the on-vehicle database. The level of validation is resource intensive and limited in capability since it is likely that driver's in the real-world will experience unique scenarios that have not been identified or tested. As a result, customers may experience false event warnings for the life of the vehicle. The inventive subject matter enables a reduction in the level of validation needed, increases driver satisfaction with the feature, and enables continuous improvement in feature performance.

Figure 3:
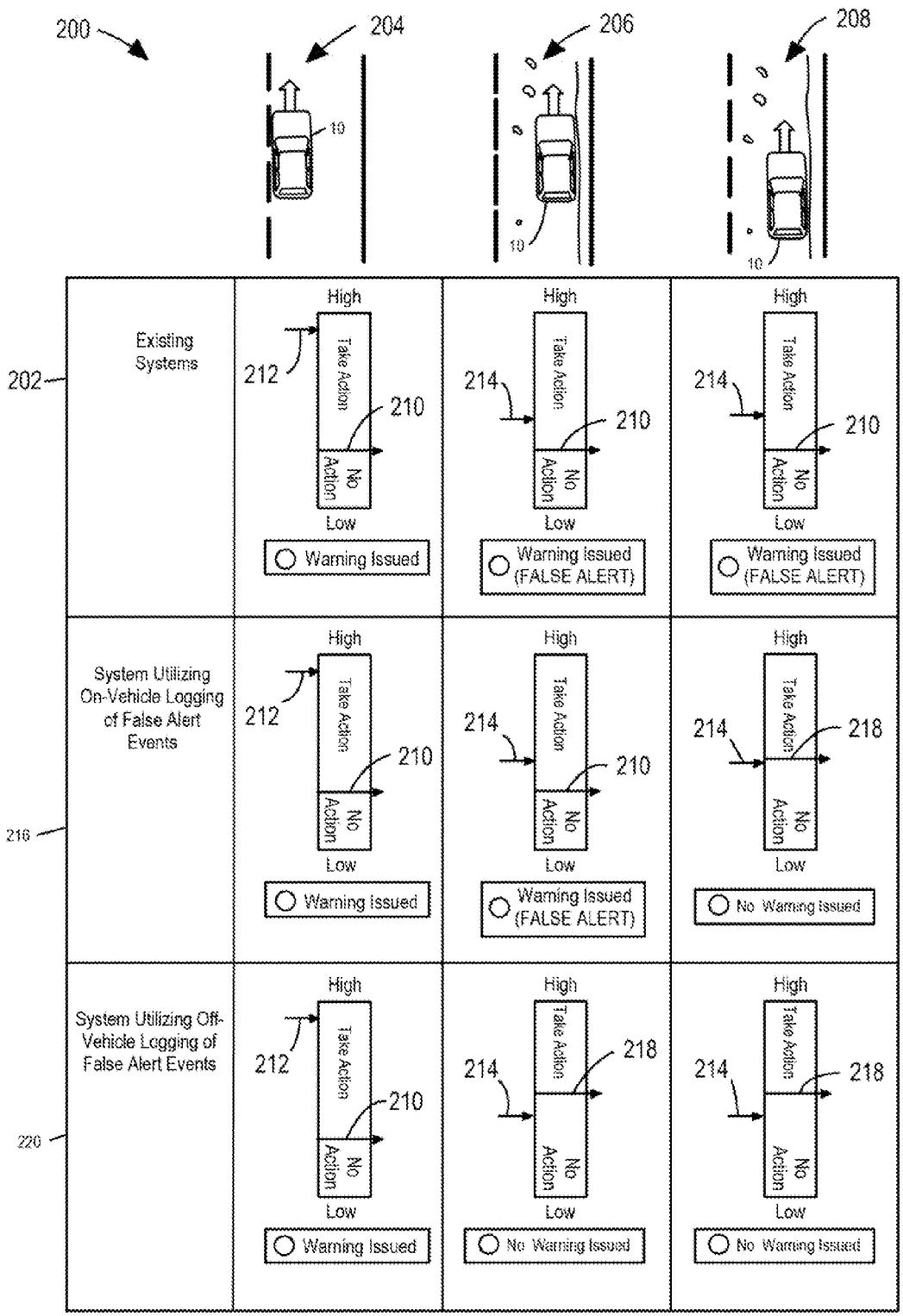
FIG. 3 is a table summarizing a comparison of known ADAS performance and the ADAS performance according to the inventive subject matter.

FIG. 3 is a table 200 that summarizes a comparison of known ADAS 202 and ADAS 216, 220 that is associated with the inventive subject matter as it applies to a lane departure warning (LDW) system. The LDW for a known system 202, a system of the inventive subject matter that stores false warning data and updates an on-board database and a system of the inventive subject matter that stores false warning data and shares the data between on-vehicle and off-vehicle databases. A first GPS location 204 is a location that is known to have a high confidence level. A high confidence level may mean that the lane has well defined lane markings and good road conditions. A second location 206 is a location with low confidence meaning it may have poorly defined lane markings and difficult road conditions such as tar strips, patches, or ghost lines to name a few examples. A low confidence results in false output warnings. Subsequent passes through the low-confidence location are shown in column 208. For the known system 202 as it applies to each location 204, 206 and 208, a threshold 210 is set and a confidence level 212 is assigned by the system.

Looking at an event where the vehicle 10 is approaching a limit of the lane width for a location with high confidence 204, a known system 202 will make an engineering tradeoff between incorrect activation on a non-lane or road edge, (a false output warning), and missed activation on an actual lane or road edge (a missed target). Under ideal, or nearly ideal, conditions the system may readily identify actual lane departure events. For the location with low confidence 206 having less than ideal conditions, the known system 202 must decide if enough confidence 214 exists in sensor data to exceed the predetermined threshold 212. It is known that the decision made by the known system 202 will, at times, result in a false warning. For known systems 202, the confidence level remains unchanged, even for subsequent passes 208 through the location with low confidence. The confidence level 214 and the predetermined threshold 212 remain the same, thereby resulting in a high probability that false warnings will continue. The result is driver dissatisfaction because every time the driver passes through the same location, a false warning may issue.

Looking at a system according to one embodiment of the inventive subject matter 216 at the location with high confidence 204, under ideal or nearly ideal conditions, the system may readily identify actual lane departure events. For the location with low confidence 206, if a warning occurs, a comparison is made to data available in the on-board vehicle database system and the EH system. Without any significant change in driver input and a vehicle trajectory that is consistent with EH data, then the inventive subject matter detects and identifies a false warning. The GPS location of the false warning is recorded in the on-vehicle database an adjusted threshold 218 may be implemented in the ADAS 216. Therefore, subsequent passes 208 through the same location, now with a higher threshold 218 for the particular GPS location, will result in a false warning being averted. According to this embodiment of the inventive subject matter, when a false warning is detected by the system, the GPS location of the event is recorded and compared locally, in the on-vehicle database, and allows the threshold level for the GPS location to be raised. Therefore, subsequent passes through the same location must meet the adjusted threshold and the risk of false warnings is reduced.

Looking now at a system according to another embodiment of the inventive subject matter 220 which also utilizes access to the off-vehicle database, such as by way of the EH system, potential lane departure events may be evaluated against data relevant to the particular GPS location that has a history from both the on-vehicle database and the off-vehicle database. The advantage is that a first pass through the location 206 with low confidence will result in a comparison to database information that may already have been uploaded from the off-vehicle database having a history from other drivers who have passed through the particular GPS location and experienced a false warning. In this regard, data from the off-vehicle database indicates that lane markings and road condition in this GPS location warrant a higher confidence before issuing a warning, thereby averting a false warning, even on the first pass as the threshold 218 has already been adjusted based on historical data from the off-vehicle database. Likewise, subsequent passes 208 through the same location would avoid false warnings.

In the foregoing specification, the inventive subject matter has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. An advanced driver assistance system comprising:
    one or more output devices operable to output a warning to a driver;
    one or more memory locations to store a history of GPS coordinates associated with an output warning; and
    a processor in communication with the output devices and memory locations, the processor being configured to identify a false output warning, compare a set of GPS coordinates associated with the false output warning to the history of GPS coordinates associated with false output warnings, and adjust a predetermined threshold setting used by the output devices to output a warping to a driver based on the history of GPS coordinates associated with false output warnings.

2. The advanced driver assistance system of claim 1 wherein one or more memory locations further comprises an on-vehicle database.

3. The advanced driver assistance system of claim 2 wherein one or more memory locations further comprises an off-vehicle database.

4. The advanced driver assistance system of claim 3 further comprising an updated history of GPS coordinates associated with an output warning replacing the history of GPS coordinates upon identification of a false output warning and comparison of the GPS coordinates.

5. The advanced driver assistance system of claim 2 further comprising an updated history of GPS coordinates associated with an output warning replacing the history of GPS coordinates upon identification of a false output warning, and comparison of the GPS coordinates.

6. A method for updating an advanced driver assistance system carried out in a controller on a vehicle, the method comprising the steps of:
    determining a false output warning of the advanced driver assistance system associated with a vehicle location;
    determining present GPS coordinates of the vehicle location;
    comparing the present GPS coordinates to a database having stored GPS coordinates saved in a memory to determine whether the present GPS coordinates correspond to stored GPS coordinates;
    if the present GPS coordinates do not correspond with stored GPS coordinates, updating the stored GPS coordinates associated with a false output warning to include the present GPS coordinates; and
    if the present: GPS coordinates do correspond with stored GPS coordinates, adjusting a predetermined threshold setting used in determining a false output warning to prevent future false output warnings for the vehicle location.

7. The method as claimed in claim 6 further comprising the step of accessing an on-vehicle database for stored GPS coordinates.

8. The method as claimed in claim 7 further comprising the step of accessing an off-vehicle database for stored GPS coordinates.

9. The method as claimed in claim 6 wherein the step of updating the stored GPS coordinates further comprises the step of communicating present GPS coordinates associated with a false output warning that are not already stored to an off-vehicle database.

10. The method as claimed in claim 6 wherein the step of updating the stored GPS coordinates further comprises the step of receiving newly stored GPS coordinates associated with a false output warning from an off-vehicle database.

11. A vehicle comprising:
    as global positioning system determining a sot of GPS coordinates associated with a vehicle location;
    an advanced driver assistance system having one or more output devices operable to output a warning to a driver relative to a present set of GPS coordinates;
    an on-vehicle database in communication with the GPS and the advanced driver assistance system to store a history of GPS coordinates associated with false warnings from the advanced driver assistance system; and
    a processor in communication with the output devices and the on-vehicle database, the processor configured to identify a false warning for the present set of GPS coordinates, compare the present set of GPS coordinates to the history of GPS coordinates associated with false warnings, add the present set of GPS coordinates to the history of GPS coordinates if the present set of GPS coordinates is not already stored in the history, and adjust a predetermined threshold setting used by the output devices to output a warning if the present set of GPS coordinates is already stored in the history of GPS coordinates.

12. The vehicle as claimed in claim 11 further comprising an off-vehicle database to store a history of GPS coordinates associated with false warnings, wherein the on-vehicle database and the off-vehicle database are capable of sharing data associated with histories of GPS coordinates.

13. The vehicle as claimed in claim 12 wherein the off-vehicle database is part of an electronic horizon system.

* * * * *